United States Patent [19]

Mijot et al.

[11] 4,393,942
[45] Jul. 19, 1983

[54] VEHICLE-SUPPORTED THREE-POINT COUPLING AND POSITION RESPONSIVE FLUID BLOCKING DEVICE THEREFOR

[75] Inventors: Guy Mijot; Léon Derycke, both of Reims; Didier Dienne, Guignicourt; Roger Martinot, Reims, all of France

[73] Assignee: Attelages Lemoine - La Mecano - Soudure Remoise, Reims, France

[21] Appl. No.: 120,420

[22] Filed: Feb. 11, 1980

[30] Foreign Application Priority Data

Feb. 16, 1979 [FR] France .................... 7904034

[51] Int. Cl.³ .............................. A01B 63/10
[52] U.S. Cl. .......................... 172/2; 172/445; 280/446 A
[58] Field of Search ........... 172/2, 47, 439, 443, 172/445; 280/432, 446 A, 456 A, 460 A, 461 A

[56] References Cited

U.S. PATENT DOCUMENTS

| | | | |
|---|---|---|---|
| 2,822,738 | 2/1958 | Smith | 172/443 X |
| 3,078,930 | 2/1963 | Foote | 280/461 A X |
| 3,145,781 | 8/1964 | Rogler | 172/439 X |
| 3,310,123 | 3/1967 | Abbott | 280/460 A X |
| 3,750,757 | 8/1973 | Saetti | 280/461 A X |
| 4,125,271 | 11/1978 | Wiboltt et al. | 280/461 A |

FOREIGN PATENT DOCUMENTS

| | | | |
|---|---|---|---|
| M 19499 | 1/1956 | Fed. Rep. of Germany | 172/439 |
| 2804129 | 8/1968 | Fed. Rep. of Germany | 172/439 |
| 54513 | 3/1967 | German Democratic Rep. | 172/439 |

Primary Examiner—Richard T. Stouffer
Attorney, Agent, or Firm—Pollock, Vande Sande & Priddy

[57] ABSTRACT

The invention discloses a "three-point" coupling suitable for use both at the front and at the rear of an industrial, agricultural, public works or forestry vehicle, e.g., a tractor.

To each bracket of a crossbar attached to a tractor there are pivoted on one side, the rod of a jack and on the other hand firstly a traction rod and secondly one end of a device of adjustable length, the other end of which is pivoted to the associated bar. The two jacks are connected mutually and to a common hydraulic energy source, and the stroke of each piston can be limited in order to determine the final vertical position of the bars by a shutter block carried by one of the jacks and actuated by an adjustable stop fitted on a rod integral with the rod of the jack coming into contact with an actuating push rod of the block.

16 Claims, 12 Drawing Figures

PRIOR ART

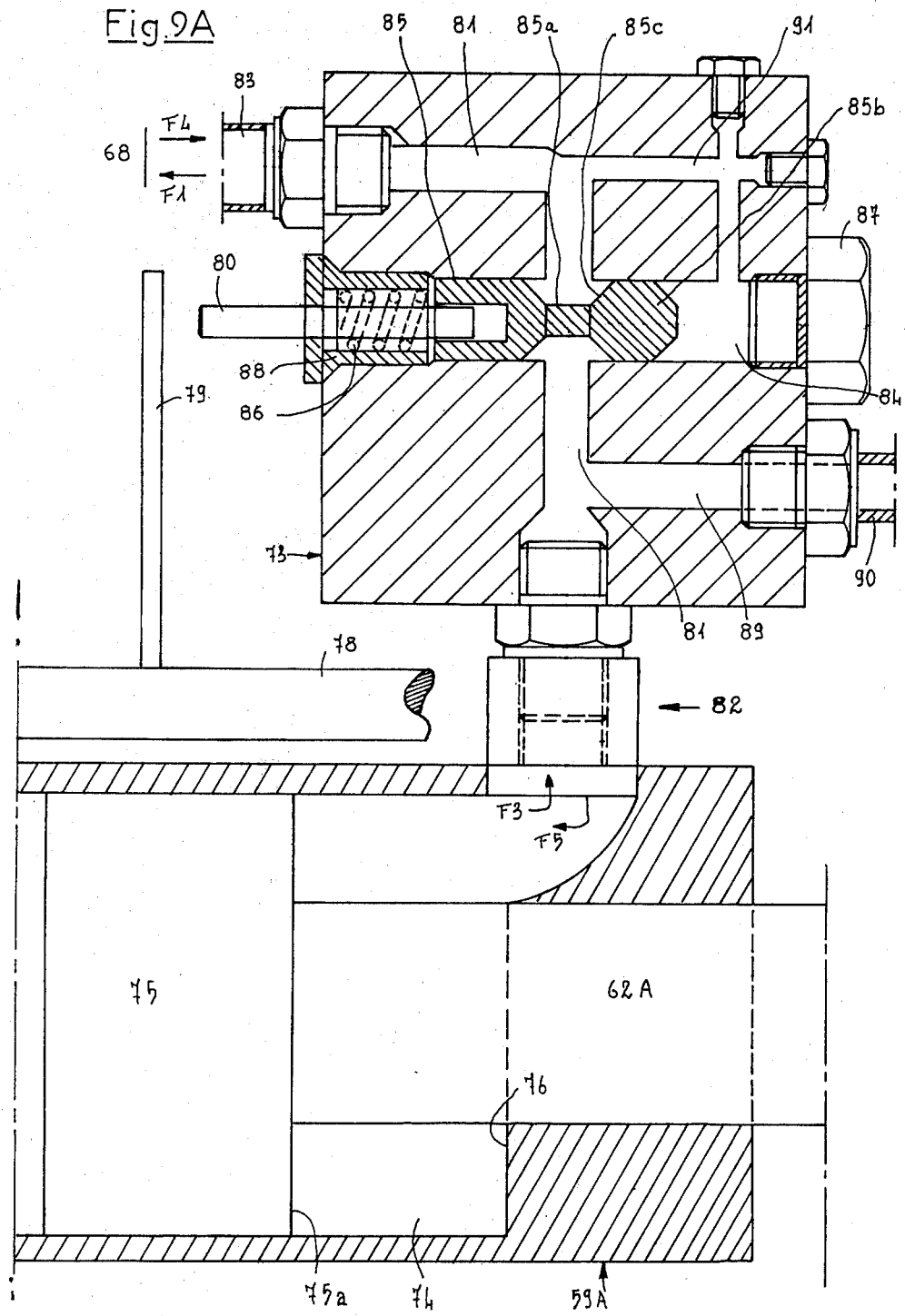

VEHICLE-SUPPORTED THREE-POINT COUPLING AND POSITION RESPONSIVE FLUID BLOCKING DEVICE THEREFOR

BACKGROUND OF THE INVENTION

The present invention relates to a "three-point" coupling suitable for use both at the front and at the rear of an industrial, agricultural, public works or forestry vehicle, for example, a tractor.

"Universal" coupling assemblies are known for tractors of any type permitting the attachment, at one, two or three points of an agricultural accessory, and comprising at least some of the following elements: two traction bars formed on one piece or of two mutually articulated elements and capable of pivoting in vertical planes by the action of jacks connected to a common liquid source and mutually connected so as to function simultaneously, and the cylinders of which are mounted pivotably with reference to the vehicle; screw devices, the length of which is adjustable and one end of which is fixed in proximity of the free end of each of the aforesaid traction bars; and a yoke to which there can be detachably pivoted one end of a thrust bar located in a vertical plane midway between the two traction bars and in which a power take-off is also located.

PRIOR ART

Coupling assemblies exhibiting at least some of the aforesaid structural details are known e.g., from U.S. Pat. Nos. 2,775,776, 3,031,208 and 3,078,930, British Pat. No. 1,500,179, German Pat. Nos. 935 512 and 2 717 855 and French Pat. Nos. 1 095 456 and 2 305 926. However, these known apparatuses exhibit certain disadvantages of a practical nature, and consequently it appeared necessary to improve them by developing a "three-point" coupling assembly suitable for use both at the front and at the rear of an industrial, agricultural, public works or forestry vehicle, e.g., a tractor.

Present Invention

A coupling assembly according to the present invention including: (a) a rigid cross-bar assembly comprising a preferably tubular horizontal distance member, the ends of which are fixed rigidly to two vertical brackets pierced with aligned holes each receiving a pivot axle associated with a device for attaching the crossbar to the vehicle; (b) the rod of one of the aforesaid jacks and secondly the second end of one of the aforesaid traction bars being attached to each of the aforesaid brackets so as to pivot about horizontal axes; (c) the device attaching the crossbar assembly to the vehicle comprising a rigid vertical rectangular frame assembly, the horizontal major sides of which are joined in the centre of their length by the aforesaid yoke, and the vertical minor sides of which are prolonged downwards and are pierced with holes aligned horizontally with those of the vertical brackets of the rigid crossbar assembly; and (d) the two jacks are connected to the aforesaid common liquid source by means of an auxiliary valve with manual control, said common liquid source comprising a tank and a dump, the functioning of which, caused by the aforesaid valve, can be stopped in known manner by a safety device which acts in case of overpressure. At least one shutter block is associated with one of the jacks and is equipped with a push rod capable of coming into contact with an associated stop when the stroke of the rod of the aforesaid jack reaches the position corresponding to the desired inclination for the traction bars and of cutting off simultaneously the supply of the two jacks at the same time as the connection between the two jacks and the aforesaid source is changed so as to permit the initiation of a stroke of the jacks in an inverse direction up to a second position corresponding to a second desired angular position for the traction bars, after restoring the auxiliary valve to functioning.

BRIEF DESCRIPTION OF THE DRAWINGS

The invention will be better understood from reading the description, given hereinbelow with reference to the accompanying drawings, of an embodiment and of variants of detail. In said drawings.

Figure 8:
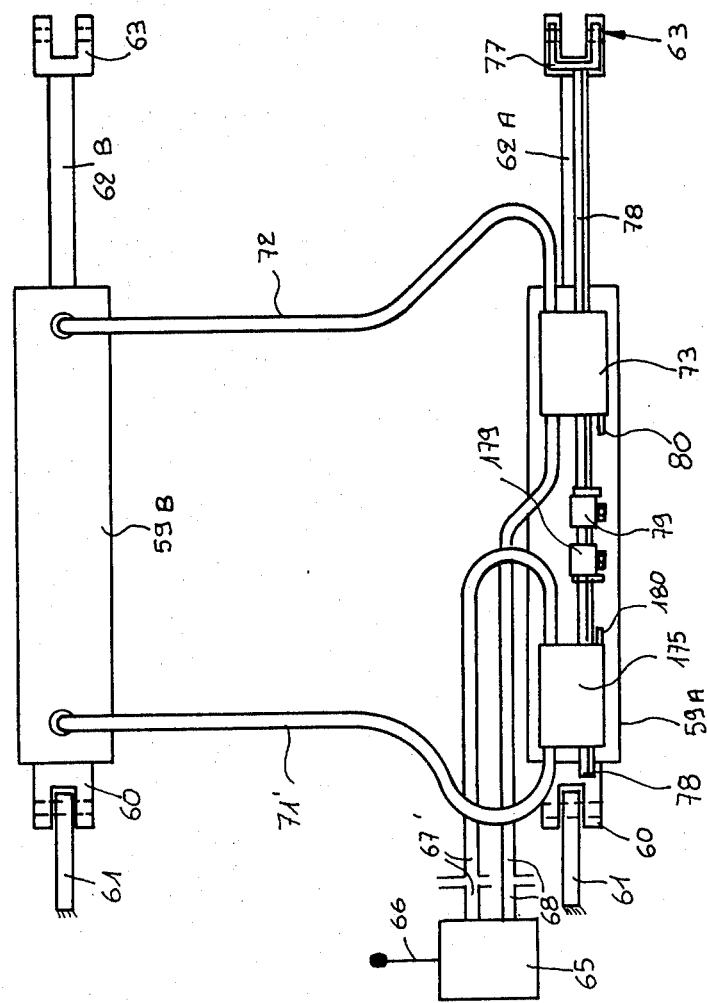
FIG. 8 is a similar plan but with two identical shutter blocks suitable for use as descent and ascent limiters in the case of double-acting jacks.

The whole of FIGS. 9A and 9B is a section of the shutter blocks of FIG. 8 and of the corresponding part of the associated jack.

Figure 4:
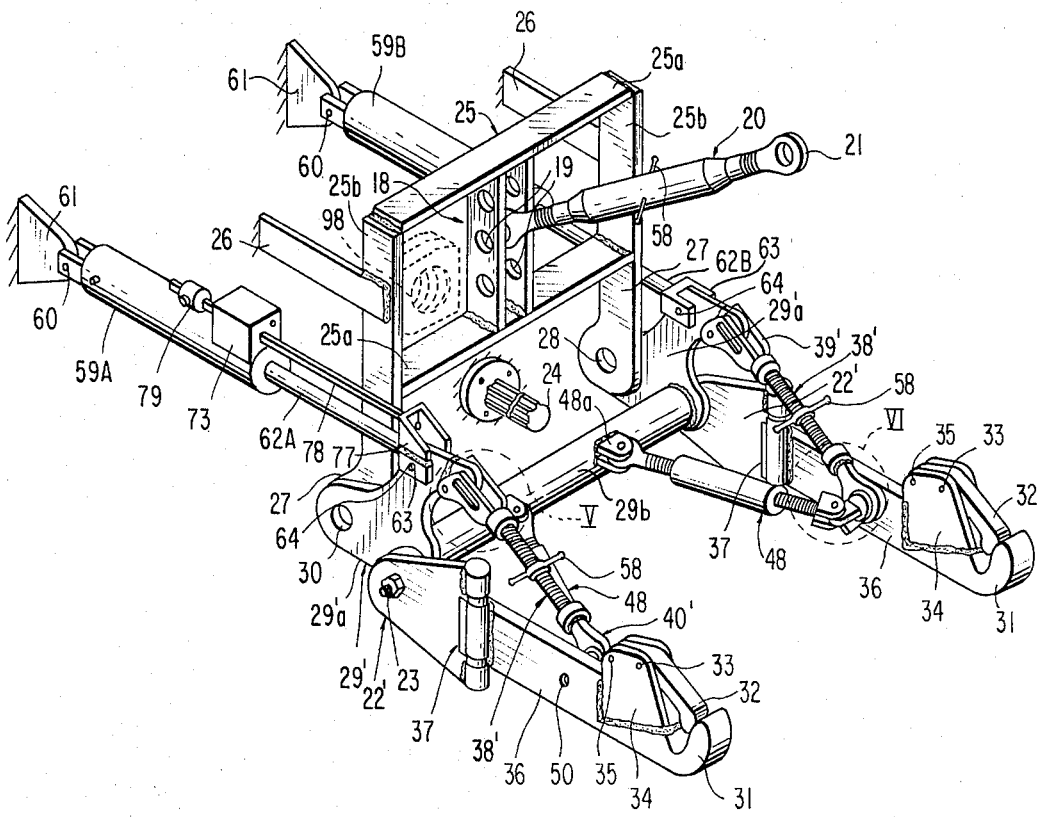
FIG. 4 is a perspective view similar to FIG. 2 and showing a variant of the traction bars.
Figure 10:
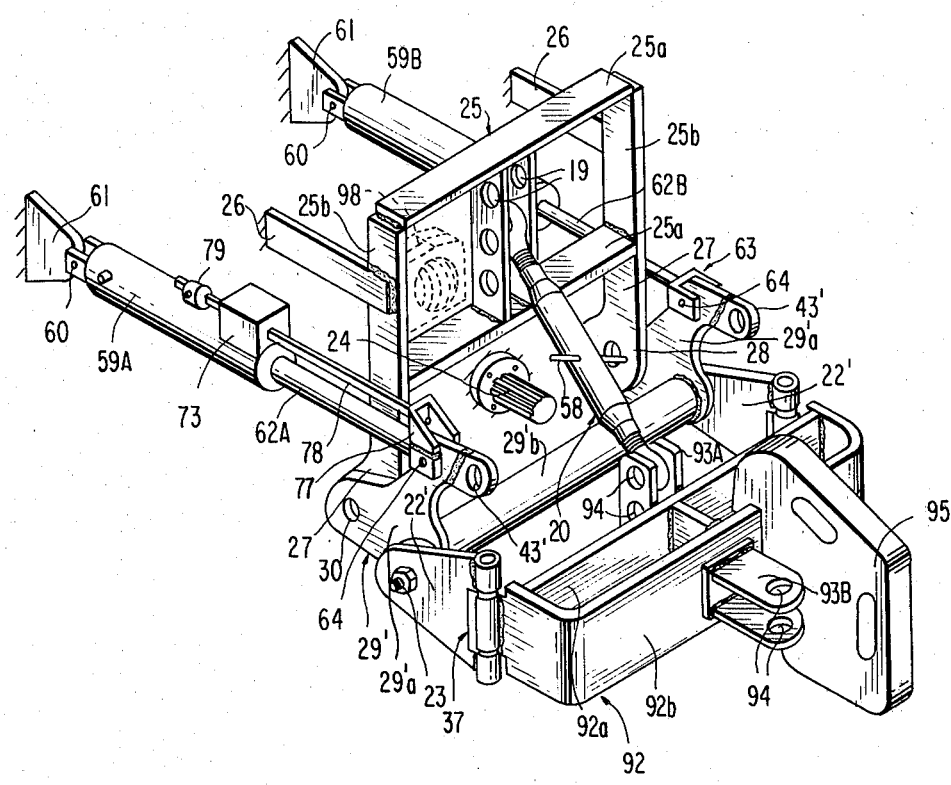

FIG. 10 is a perspective view similar to FIG. 4 and showing how an implement can be connected as close as possible to the axle of the tractor, using the three points of the coupling assembly simultaneously.

Figure 11:
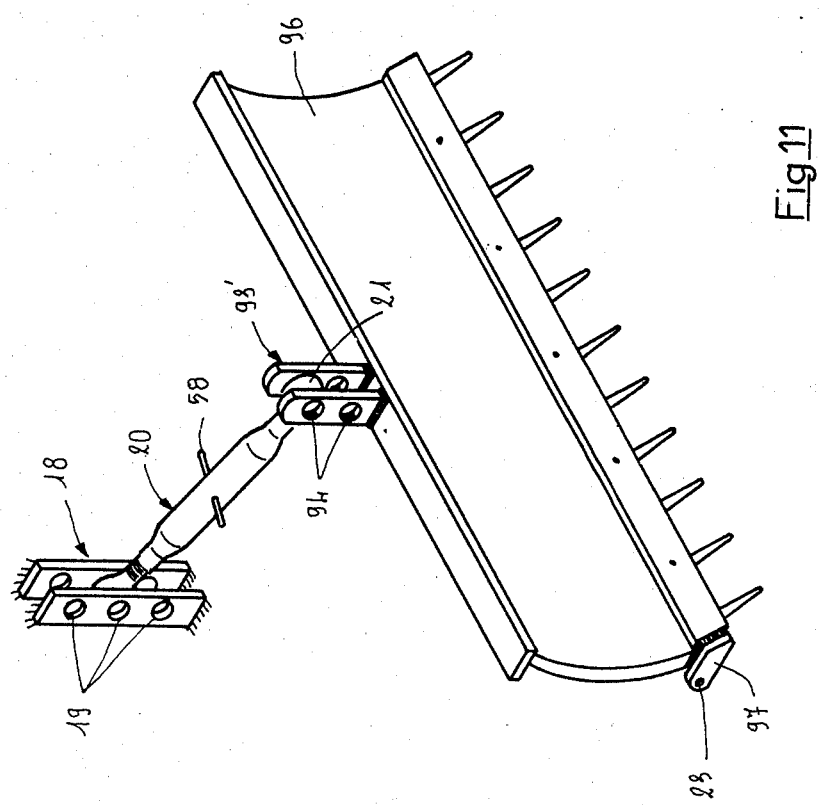

FIG. 11 is a perspective showing the attachment of an implement to the thrust bar of the coupling assembly and to the traction bars not shown.

DETAILED DESCRIPTION OF PREFERRED EMBODIMENTS

Figure 1:
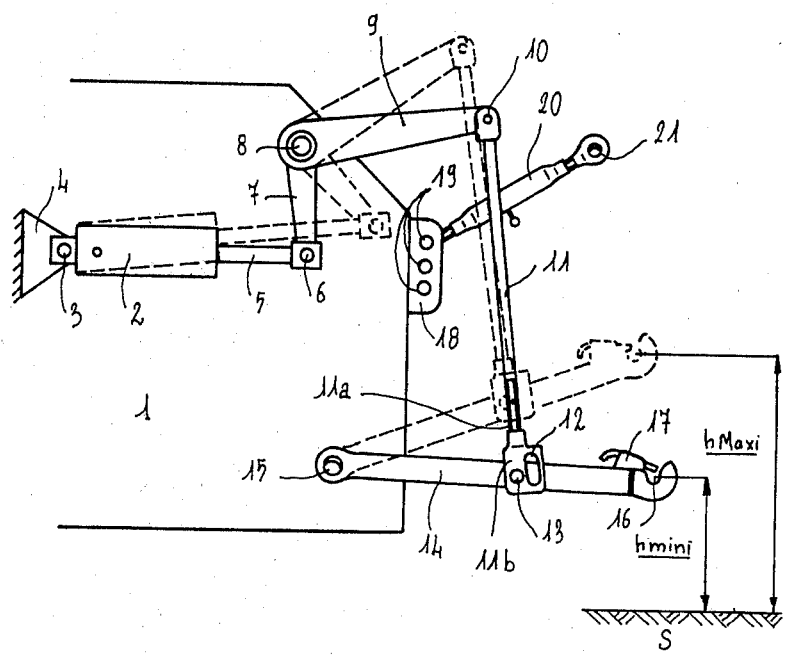
FIG. 1 is a side elevation of a known "three-point" coupling assembly and shows the traction bars in the bottom position by solid lines and the same bars in the top position by dash lines.

The coupling illustrated in FIG. 1 is a conventional "three-point" coupling assembly located at the rear of the tractor 1, which substantially comprises a hydraulic jack 2 pivoted at 3 to a part 4 attached to the tractor 1, the rod 5 of which is pivoted at 6 to one end of a connecting rod 7. Said connecting rod is pivoted at its opposite end to a horizontal axle 8 integral with the tractor 1, to which two upper arms 9 are pivoted. Two tubular lifting rods 11 are pivoted to the opposite ends of said arms at 10. The length of said rods is adjustable due to the fact that a screw 11a inserted into the lower end of each of them can project more or less downwards and is integral with a yoke 11b pierced on the one hand with two more or less vertically aligned ports 12 and on the other hand with two aligned holes 13. Two traction bars 14 are pivoted to the tractor 1 at 15 and are articulated to the yokes 11b of the rods 11 by means of axles (not shown) inserted either into the ports 12 or into the holes 13. To the free end of each of the bars 14 there is attached a hook 16 intended to receive a hooking element (not shown) of an implement, which may be locked by a locking device 17. Likewise attached to the tractor 1 is a vertical yoke 18 in which one end of a thrust bar 20, the other arm of which carries an articulation 21, can be fitted pivotably and detachably. The actuation of the jack of the coupling assembly is effected by valves and control levers not shown.

In FIG. 1, the coupling assembly is shown by solid lines in the position of minimum height of the traction bars 14 with reference to the ground S, and in dash lines the coupling assembly in the position of maximum height of said bars.

In the case of a frontal coupling assembly, the construction is practically the same, but the actuation is obtained by at least one more or less vertical jack.

One disadvantage of this type of coupling assembly is that there are four axes of rotation (at 3, 8, 15 and 19) and five articulations (at 6, 10, 12 or 13, 16 and 21), the two latter involving only the implement associated with the coupling assembly.

The invention has as its object to eliminate these disadvantages and to produce a coupling assembly having better qualities as a frontal coupling assembly, due firstly to the use of two horizontal drive jacks each associated with a traction bar, the position of which prevents any difficulty when the tractor's headlamps or the frontal power take-off are used, and secondly to the use of a shutter block which acts upon both the jacks to facilitate the adjustment of the vertical position of the hooks of the traction bars.

FIGS. 2 to 6 show a "three-point" coupling assembly according to the invention adaptable for attachment to a vehicle (not shown) by a device substantially comprising, firstly, a vertical yoke 18 similar to that of FIG. 1 and pierced with pairs of horizontally aligned holes 19 to receive a thrust bar 20 identical to that of FIG. 1, and secondly two traction bars 22 or 22' mounted pivotally at 23. A power take-off 24 is present in the vertical median plane of the yoke 18 and beneath the latter. The assembly comprising the yoke 18 and the pivot axles 23 of the bars 22 or 22' is preferably devised so as to be capable of being fitted both to the rear and to the front of a tractor, and the power take-off may also be at the front or the rear.

In a preferred embodiment of the invention the yoke 18 connects the centres of the horizontal major sides 25a of a rectangular frame assembly 25, the vertical minor sides 25b of which carry parts 26 for fixing to the tractor, are prolonged downwards at 27 and are pierced in proximity of their lower ends with holes 28 intended to receive pivot axles (not shown) for a crossbar assembly 29 or 29' constituted by two vertical brackets 29a or 29'a, connected by a preferably tubular horizontal distance member 29b or 29'b, and pierced with holes 30 for the passage of the axles (not shown) intended to provide a pivoting connection with the brackets 29a or 29'a. The pivots 23 of the traction bars 22 or 22' are lodged in holes (not shown) in the brackets 29a or 29'a.

Figure 2:
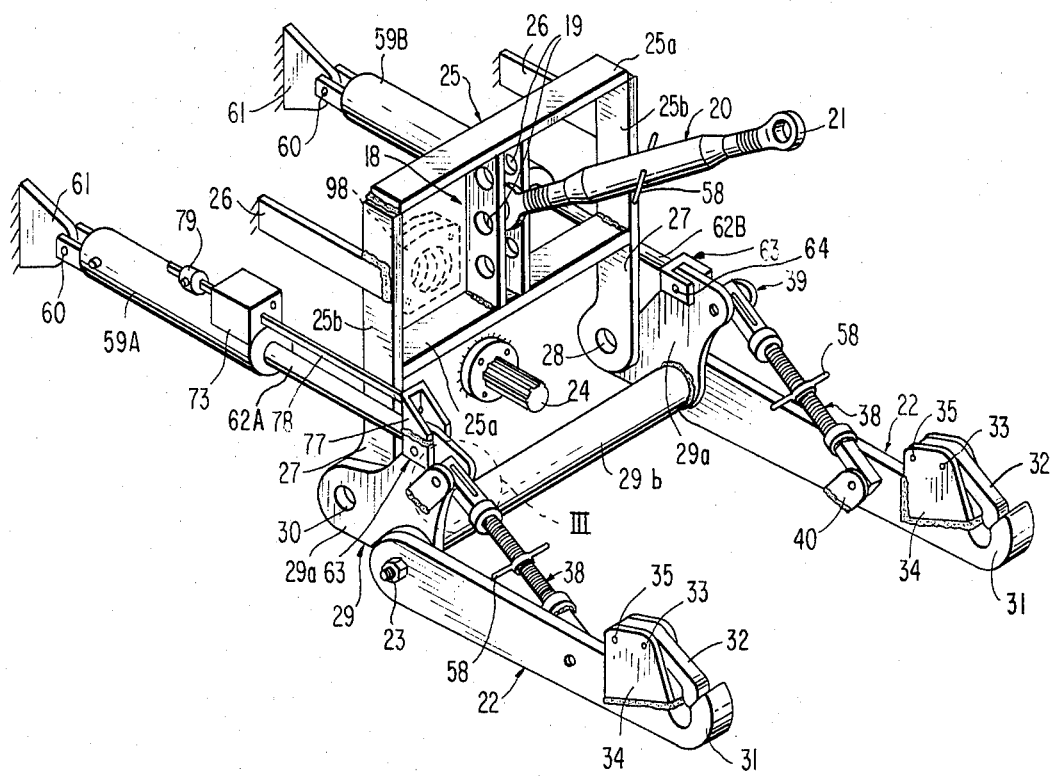
FIG. 2 is a perspective view of a coupling assembly according to the invention.

In the embodiment of FIG. 2, the traction bars 22 are of one piece and carry at their free end a hook 31 in which a hooking device, e.g., a swivel of the vehicle or the implement to be trailed, may be locked by a device 32 pivoted at 33 to two brackets 34 welded on each side of the bar 22; wherein a pin insertable into two aligned holes 35 of the brackets 34 permits the device 32 to be secured in the locking position.

In the embodiment of FIG. 4, the traction bars are of two pieces. A first piece 22' is pivoted at 23 to the associated bracket 29'a, while a second piece 36 carries the hook 31 equipped at its free end with a locking device 32 35; wherein piece 36 is pivoted to the part 22' by a vertical hinge 37. As will be seen, said hinge comprises two hollow cylindrical elements integral with the part 22' and a median element integral with the part 36; the elements being interconnected by a vertical axle, not shown.

Figure 3:
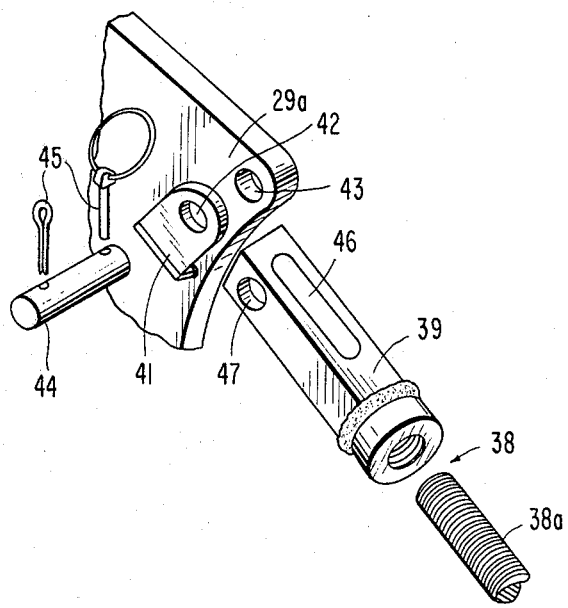
FIG. 3 is an exploded perspective view showing the attachment of the crossbar assembly of the coupling of the screw device transmitting the movement of its actuating jack to a traction bar.

In the embodiments of FIGS. 2 to 4, there are also two adjusting screws 38 or 38' pivoted by parts 39 or 39' to the associated brackets 29a or 29'a and at 40 or 40' in proximity of the corresponding hook 31. Said screws serve to adjust the inclination of the traction bars with reference to the axles 23 and thus constitute the equivalent of the rods 11 of the known construction of FIG. 1, but without necessitating the connecting rod 7 and the arms 9 as in that case.

The construction of the articulations 39 is visible in greater detail in FIG. 3. To the outside of each bracket 29a there is welded a plate 41 pierced with a hole 42 aligned with a hole 43 of the bracket to receive an axle 44 maintained in position by two pins 45. The end 39 of the device 38, into which one end of a screw 38a is screwed, is parallelepipedic in shape and performs an analogous function to that of the part 11b of FIG. 1. For this purpose it comprises a longitudinal port 46 and a transverse hole 47. The part 39 may therefore be placed at will, either in its illustrated position, i.e., with the axle 44 passing through the holes 42, 43 and 47, or with the axle 44 passing through the holes 42, 43 and the port 46; in the latter case, the part 39 and therefore the whole of the device 38, have a certain mobility with reference to the crossbar assembly 29.

In the embodiment of FIG. 4 there is a second screw device comprising two extensible members 48 fitted at 48a to the distance member 29'b of the crossbar assembly 29' so as to be pivotable about vertical axes, and pivoted at 40' to the part 36 in the same place as the devices 38'. Certain details of the manner of attaching the parts 39' and the assemblies 40' will now be described more fully with reference to FIGS. 5 and 6.

Figure 5:
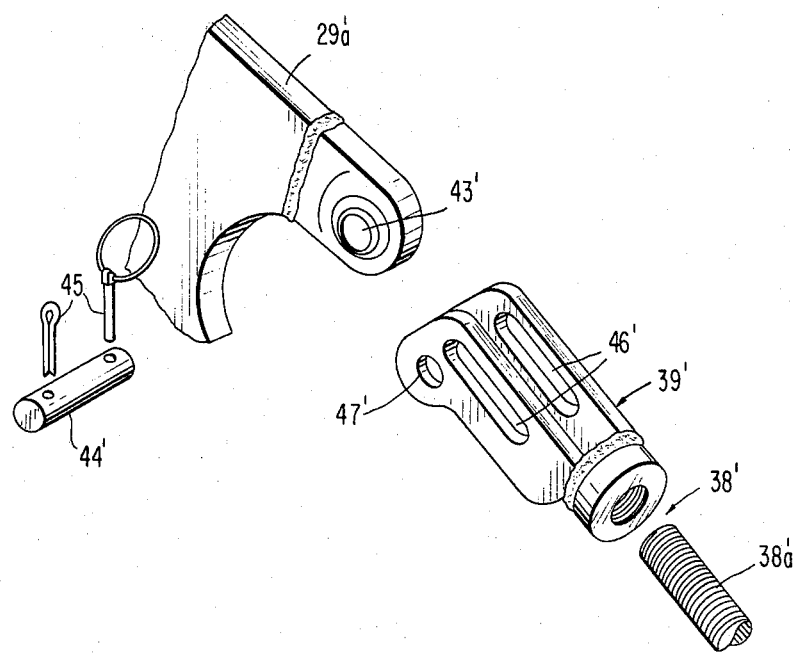
FIG. 5 is an exploded perspective view, similar to FIG. 3, showing the attachment to the crossbar assembly of the screw device of FIG. 4.

In FIG. 5, we see that each bracket 29'a does not comprise a plate such as 41 in FIG. 3, but has at its end remote from the jack a ball pierced with a hole 43'. The end part 39' of the device 38' is constituted by a yoke, the arms of which are pierced with ports 46' and with holes 47' which have the same function as the port 46 and the hole 47 in FIG. 3. It should also be stipulated that the device 38 can only be used in the case of the coupling assembly of FIG. 2.

Figure 6:
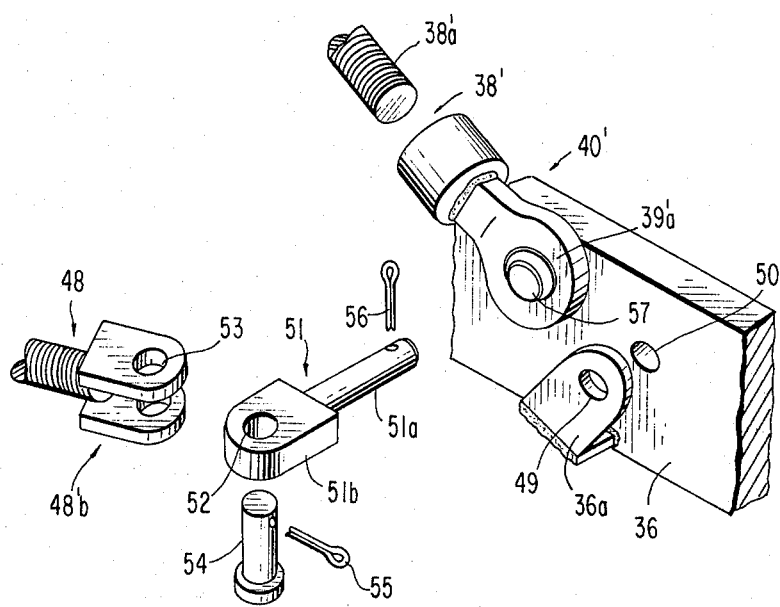
FIG. 6 is a perspective view showing the attachment to the detachable part of a traction bar of FIG. 4 of two screw devices, the other end of which is attached to the crossbar.

In FIG. 6, we see that the part 36 of each traction bar has a welded plate 36a pierced with a hole 49 aligned with a hole 50 made in the part 36 and into which there can be introduced the part 51a forming an axle of a piece 51 of which a second part 51b can be housed in a yoke 48b fitted to the end of the device 48. Corresponding holes 52, 53 made in the parts 51b, 48b respectively can receive a pivot 54 maintained by a pin 55, while another pin 56 serves to maintain the part 51a of the piece 51 in position. The end 39'a of the device 38' comprises a ball pierced with a hole 57. The assembly of the devices 38' and 48 is effected by inserting the end 39'a into the yoke 36a by assembling the pieces 48b and 51 by means of the axle 54 and of the pin 55, and inserting the axle 51a into the holes 49, 57 and 50, followed by the placing of the pin 56. In this way the devices 48 are pivotably mounted at their ends, and their length can be adjusted by acting upon a control axle 58 of known type, similar to those illustrated in the devices, 20, 38 or 38' (FIGS. 2, 4, 10 and 11), in order to pivot the pieces 36 about the axes of the articulation 37 and to adapt them to non-standard implements.

The system of actuation of the traction bars 22 or 22' will now be described.

According to the invention, two single-acting or double-acting jacks 59a, 59b (FIGS. 2, 7, 8 and 10) are pivotable attached at 60 to pieces 61 integral with the tractor, their rods 62A, 62B are pivoted by the yokes 63 and pivots 64 at the upper part of the brackets 29a and 29'a of the crossbar 29 or 29', and the pivots 23 of the bars 22 or 22' are located at the lower part of each bracket 29a or 29'a.

On the majority of agricultural tractors, the pump of the hydraulic system is permanently engaged with a drive pinion. When all the control handles are in the central position, an uninterrupted and pressureless current of oil is produced in the "tank-pump-tank" circuit. A main valve integrated with the lift block controls the "three-point" coupling when the latter is placed at the rear. A plurality of auxiliary valves may be placed on said lift block, each having a particular handle and intended for the control of auxiliary jacks for the agricultural machines carried or trailed.

It is to one of these auxiliary valves 65 (FIGS. 7 and 8) that the "three-point" coupling asembly according to the invention is connected. The auxiliary valve 65 is actuated by a handle 66 movable between two active positions, with automatic return to the central position. Two connections 67, 68 (FIG. 7) extend from auxiliary valve 65. Depending upon the position of the handle 66, oil enters either through the connection 67 or through the connections 68 from the tank or the chamber of the associated jack, the volume of which is the smallest, and leaves either through the connection 68 or through the connection 67 towards the face to be actuated of the piston of the relevant jack.

Where the jacks 59A, 59B are single-acting i.e., the oil pressure on one of the faces is always the same, one of the two outlets of the aforesaid auxiliary valve is blocked, whilst the chamber corresponding to the unloaded face of the piston is connected to the atmosphere by a breather valve.

According to the invention however, it is preferable to use double-acting jacks, and it is with reference to this construction that the operation of the control device of the traction bars 22 or 22' will now be described.

The descent of the bars may be effected either by simple gravity or by the action of the jacks 59A and 59B. In both cases, the oil leaves the valve 65 through the pipe 67 flows through a tee connection 69 and pipes 70, 71 to the ends of the jacks 59A, 59B on the left-hand side in FIG. 7. The oil contained in those parts of the jacks located on the right-hand side of the figure, which are connected by a pipe 72, returns to the aforesaid auxiliary valve 65 through the pipe 68. For greater simplicity, the pipes 67 to 72 have not been shown in FIGS. 2, 4 and 10.

But it is necessary in practice, particularly in the case of a frontal coupling assembly, to limit the descent of the traction bars 22 or 22'. Now it is impossible for the operator from the driving seat to detect precisely the exact level of the implement with reference to the ground every time, following a lift manoeuvre at the headland, he wishes to return the front mounted implement into its previous position. The simplest thing then is to prolong slightly the time for which the handle 66 of the auxiliary valve 65 is kept in the "descent" position, which is easy because the central hydraulic system of the tractor is equipped with a calibrated safety valve preventing any harmful overpressure. This is why, according to an important characteristic of the invention, there is associated with the assembly of the jacks 59A, 59B at least one shutter block 73 (FIGS. 2, 4 and 7 and 10) which is carried by the jack 59A and permits the downward (descent) movement of the traction bars 22 or 22' to be stopped in the desired position. For this purpose it is sufficient, whether the descent occurs by gravity or otherwise, to prevent the oil contained in the chamber 74 (FIG. 9A) of the jack located in front of the piston 75 thereof, between the face 75a and the end of stroke stop 76 of said piston, from returning to the valve 65. For this purpose the yoke 63 of the piston 62A carries at its summit (FIGS. 2, 4, 7, 8 and 10) another yoke 77 to which there is attached one end of a piece— e.g., a rod 78 (see also FIGS. 9A and 9B) which may or may not slide across the block 73 and which is attached to the upper part of the jack 59A by any means not shown and equipped with an adjustable stop 79 intended to come into contact with a push rod 80 (FIGS. 2, 4 and 7 to 10), the function of which will be described hereinbelow.

In FIG. 9A we see that the shutter block 73 is pierced with a right angled bore 81, the entrance of which is connected at 82 to the chamber 74 of the jack, and its exit is connected to the pipe 68 by a connection 83 as indicated by the arrow F1. In a bore 84 at right angles to the bore 81 and communicating with the latter, a slide valve 85 can slide actually by the push rod 80. Slide valve 85 includes a part 85a of reduced diameter which does not prevent the circulation of oil in the bore 81. A spring 86 is inserted between the slide valve 85 and the exterior wall of the block 73, and the bore 84 is blocked at its respective ends by a shutter screw 87 and by a hollow bolt 88 in which the spring 86 is located. A bore 89 parallel to the bore 84 starts from the bore 81 and terminates at a connection 90 to which is connected the pipe 72 (FIG. 7) which terminates at the corresponding end of the jack 59B. Lastly, a bore 91 forming a right angle and of small diameter connects the bores 81 and 84.

The functioning of the shutter block 73 is as follows: either oil enters, through the pipe 67, the connection 69 and the pipes 70 and 71, at the left-hand end of the jacks 59A and 59B (as may be seen in FIG. 7 and as the arrow F2 and the reference 67 show in FIG. 9B) in the case of double-acting jacks, or else air is admitted through breather valves (not shown) which replace the end of the pipes 70 and 71 of FIG. 7 in the case of single-acting jacks. The oil contained in the chamber 74 passes through the connection 82 in the direction of the arrow F3 of FIG. 9A and exits in accordance with the arrow F1 towards the valve 65 by the connection 83 and the pipe 68, likewise the oil entering from the corresponding chamber of the jack 59B through the pipe 72, the connection 90 and the bore 89. When the adjustable stop 79 comes into contact with the push rod 80, the latter moves towards the right and entrains the slide valve 85 in that direction until the latter abuts against the screw 87. The bore 81 is then closed and the piston 75 of each jack is consequently locked. The traction bars 22 or 22' then occupy the desired bottom position.

Figure 7:
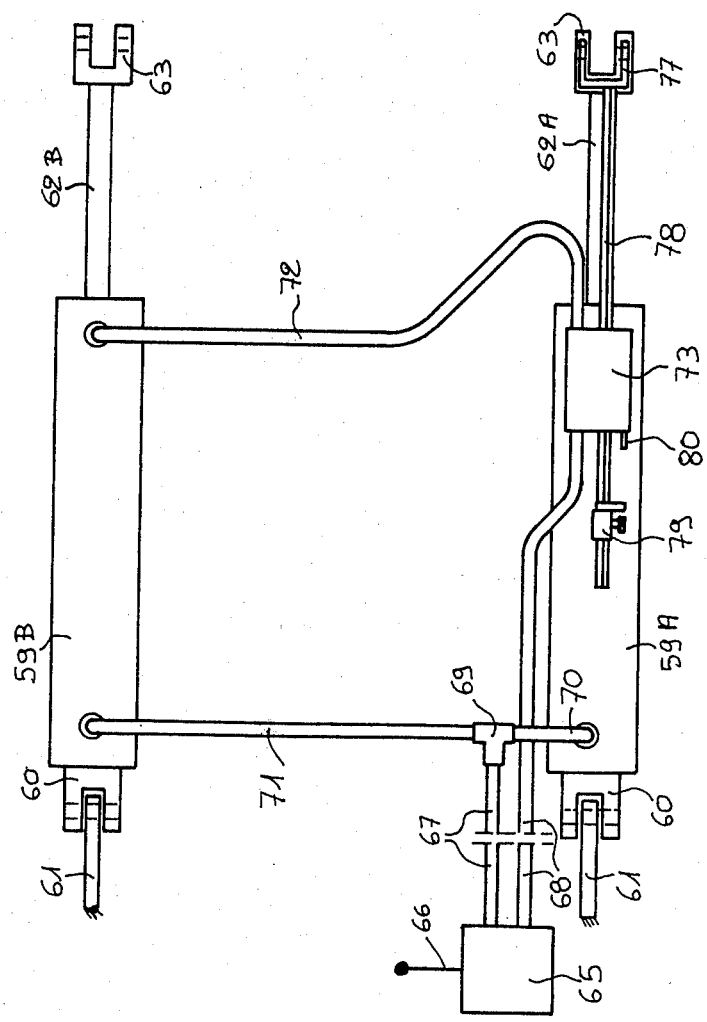
FIG. 7 is a general plan of the jacks and of a shutter block suitable for use as a descent limiter in the case of single-acting or double-acting jacks.
Figure 9:
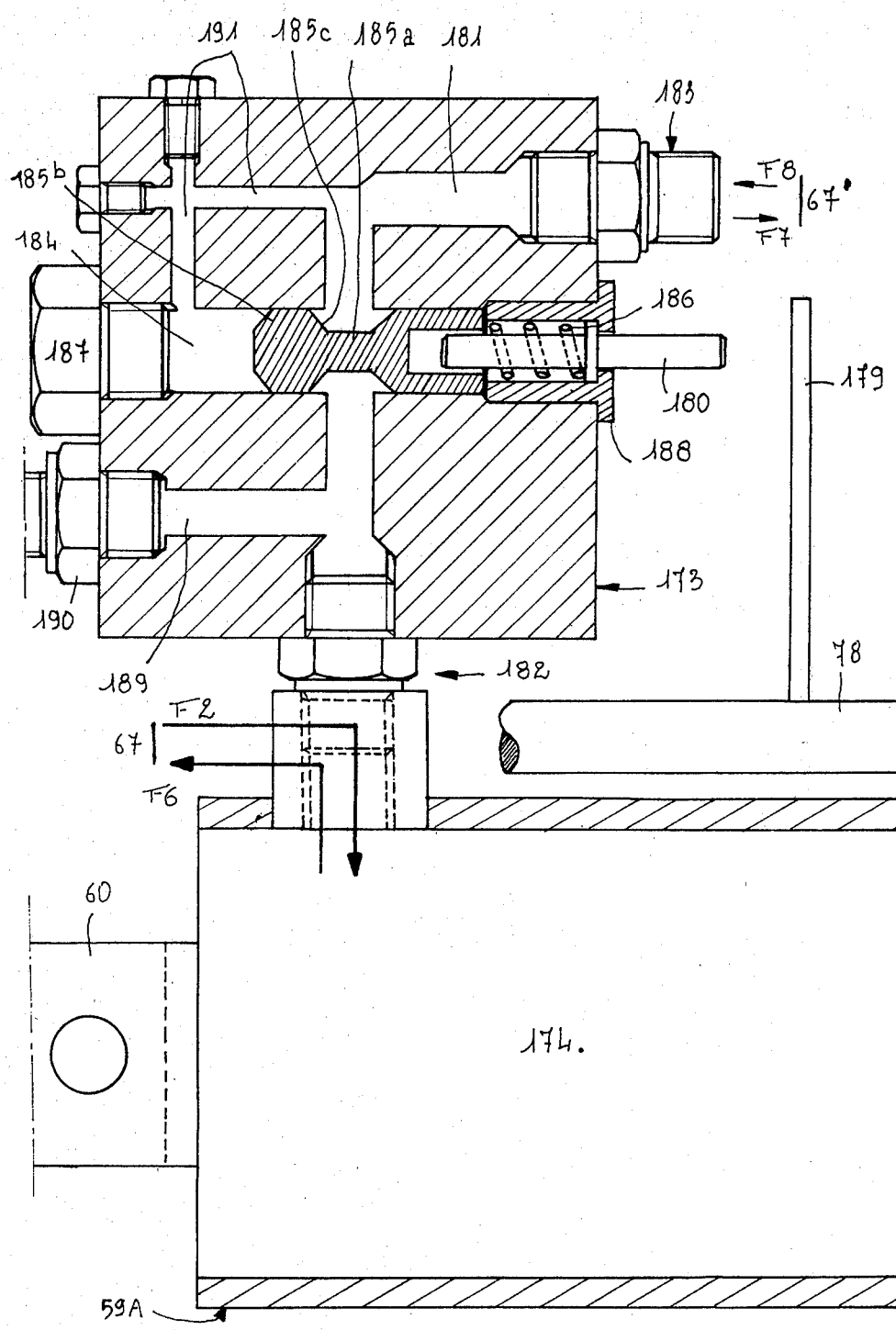

In practice however it is necessary for the pistons 75 of the jacks 59A and 59B to be able to resume without difficulty their movement towards the left-hand side of FIGS. 7 to 9 in order to permit the traction bars 22 or 22' to be raised by passing oil to the right of the jacks when the slide valve 85 is in its end of stroke abutment against the screw 87. For this purpose the handle 66 of the valve 65 is actuated to allow oil to enter, through the pipe 68 in the direction of the arrow F4, the connection 83 and the horizontal upper part of the bore 81 and penetrates into the bore 91 since the vertical part of the bore 81 is closed by the slide valve 85. Now, as FIG. 9A shows, said slide valve has a bevelled end 85b and the oil acts upon it and thrusts the slide valve towards the left, compressing the spring 86 but without moving the push rod 80, which is still in contact with the stop 79. This slight movement of the slide valve brings another bevelled surface 85c which forms the connection between the large diameter part of the slide valve and the smaller diameter part 85a and is then in partial alignment with the bore 81, so that a small quantity of oil under pressure can then enter, in the direction of the arrow F5, and via the bore 81 and the connection 82, the chamber 74, which initiates a movement of the piston 75 towards the left. The oil present to the left of piston 75 then returns to the valve 65 through the pipes 70, 71 and 67, in the direction of the arrows F6 of FIG. 9B, in the case of double-acting jacks. When the slide valve 85 has resumed its position as in FIG. 9A, oil at the maximum pressure enters the right-hand side of the jack 59A through the connection 82 and the right-hand side of the jack 59B through the bore 89, the connection 90 and the pipe 72, which raises the traction bars 22 or 22' up to their maximum height or until the operator actuates the valve 65.

However, the presence of a single shutter block 73 does not permit the desired vertical position of the traction bars to be adjusted. According to the variant illustrated in FIG. 8 and FIG. 9B, therefore, in the case of double-acting jacks a second shutter block 173 is provided identical with the block 73, and therefore not requiring a fresh description, the references being the same increased by 100. Consequently only an extremely brief description of the functioning will be given, assuming the bars 22 or 22' to be in the bottom position, either at the end of stroke or at a height determined by the stop 79 and the push rod 80.

The oil enters, through the pipe 68 and the connection 83, the bore 81 of the shutter block 73, and from there firstly through the bore 89, the connection 90 and the pipe 72, the right-hand end of the jack 59B, and secondly, through the connection 82, the chamber 74 of the jack 59A. The oil present in the chamber 174 of the jack passes through the connection 182 (and not directly as shown by the arrow F6 as in the case of FIG. 7) into he bore 181 of the block 173 and exits through the pipe 67' (FIG. 8), in the direction of the arrow F7, towards the valve 65, at the same time as the oil entering from the left-hand part of the jack 59B through the pipe 71', the connection 190 and the bores 189 and 181. The piston 75 moves towards the left, entraining the rod 78 and therefore the stop 179 until the latter comes into contact with the push rod 180. The continuation of the movement moves the slide valve 185 to the left, which closes the bore 181 and locks the piston 75 for each jack. The traction bars 22 or 22' then occupy the desired top position, determined by the adjustment of the stop 179 on the rod 78.

It is obviously desirable to be able to lower the traction bars as rapidly as possible afterwards. Consequently, in a similar manner to that which was previously, the operator actuates the handle 66 of the valve 65 and oil enters, through the pipe 67', the connection 183, in the direction of the arrow F8, follows the bores 181 and 191, and returns the slide valve 185 to the right, compressing the spring 186. Oil then enters, firstly, through the bore 189, the connection 190 and the pipe 71', the left-hand side of the jack 59B, and on the other hand, through the connection 182, the chamber 174 of the jack 59A, which moves the piston 75 to the right.

If it is desired to be certain that the traction bars will remain reliably in the position which they have just assumed in the manner previously indicated, whether in the bottom position or in the top position, an appropriate alarm device may be provided which signals the moment when the contact between the push rod 80 and 180 and the stop 79 or 179 is broken. Said device may be e.g., an electric circuit connected firstly to the push rod and secondly to the stop, and which is broken, thus tripping a signal, upon the separation of said two elements. Such a device is easy to fit on the jack 59A.

It should be observed that although the shutter block 73 can in practice be used with single-acting jacks in order to raise the bars 22 or 22', since it is possible to make said bars descend by gravity, the block 173 is only suitable for use with double-acting jacks.

Referring now to FIG. 10, we see that the pieces 36 have been dismantled and replaced by elements which must be brought closer to the tractor. For example, a chest 92 carries on its wall 92a, articulated at 37, a vertical yoke 93A perforated with holes 94 to receive the end 21 of the thrust bar 20, and on its wall 92b a horizontal yoke 93B pierced with holes 94 to receive an implement, not shown. Lastly, a ballast element 95 may possibly be fixed either to the wall 92a or to the wall 92b.

In FIG. 11 we see a grader blade 96 which carries at its top a yoke 93' perforated with holes 94 to receive the end 21 of the thrust bar 20. In this case the traction bars 22 or 22' are dismantled and the lower part of the implement 96 is pivoted directly upon the axles 23 by parts 97 welded and projecting towards the tractor (not shown).

Lastly it will be pointed out that actuation of the traction bars by means of two parallel horizontal jacks and the use of a frame for attachment to the tractor such as 25, 27 associated with a cross-bar assembly such as 29 or 29' permits, in the case of a frontal coupling assembly, the normal use without any difficulty of the tractor headlamps, only one of which is shown at 98 in FIGS. 2, 4 and 10, also that of the front power take-off and of the universal shaft (not shown) prolonging it.

Another advantage of the invention is the reduction of the number of articulations (single or double) of the actuating members of the traction bars. The connection between each jack and the associated bar is made in practice by means of a single piece, the device 38 or 38'.

A third advantage is the possibility, by virtue of the use of at least one shutter block 73, of precision adjustment of the angular position of the traction bars where the use of the coupling assembly involves a regular succession of said upward or downward movements.

It is to be understood that many variations may be made to the embodiments described, which are purely illustrative, without departing from the spirit and scope of the invention.

What is claimed is:

1. A vehicle-supported three-point coupling assembly for coupling an implement to one end of said vehicle, wherein said coupling assembly comprises:
a rectangular frame assembly fixedly mounted to said vehicle, said frame assembly including a pair of vertically extending sides, a pair of horizontally extending sides interconnecting said vertically extending sides and supporting a yoke for receiving an end of a thrust bar;
a cross-bar assembly including a pair of traction bars pivotally connected to vertically extending support brackets at one end and extending horizontally away from said vertically extending brackets, said support brackets pivotally connected to said vertically extending sides, said support brackets further being interconnected by a tubular bar, said traction bars supporting at a remaining end thereof an implement holding means, whereby said cross-bar assembly including said traction bars can pivot in a vertical direction pivoting said implement holding means;
first and second screw adjustment means each connecting one of said vertically extending brackets to a respective one of said traction bars, said screw adjustment means determining the angular relationship between said cross-bar assembly and said brackets;
a fluid operated jack assembly connected to said vehicle and to said support brackets;
conduit means supplying an operating fluid to and from said jack assembly;
a shutter block means for blocking fluid flow through said jack assembly, said shutter block means having an actuator responsive to a predetermined relative position of said support bracket with respect to said vehicle; and
valve means for controlling the direction of fluid flow through said conduit means and said jack assembly, whereby said cross-bar assembly moves vertically until said support bracket arrives at said predetermined relative position with respect to said vehicle.

2. A coupling assembly according to claim 1 wherein each said screw adjustment means comprises a screw member having an end pivotally attached to a respective one of said traction bars and a further end engaging a fastening part pivotally attached to a respective one of said support brackets.

3. A coupling assembly according to claim 2, wherein each of said support brackets inlcudes a pivot axle and each said fastening part includes an opening therethrough, said opening being slightly larger in size than said pivot axle, said pivot axle being inserted through said opening permitting pivotal movement of said fastening part relative to said support bracket while preventing longitudinal movement of said fastening part relative to said support bracket.

4. A coupling assembly according to claim 2, wherein each of said support brackets includes a pivot axle and each said fastening part includes an elongated port extending therethrough, said elongated port having an axis parallel to a longitudinal axis of said fastening part and said elongated port defining a minimum opening slightly larger than said pivot axle, whereupon insertion of said pivot axle through said elongated port allows for both pivotal movement of said fastening part and longitudinal movement of said fastening part relative to said support bracket.

5. A coupling assembly according to claim 2, wherein each said fastening part is substantially parallelepipedic in configuration and includes an elongated port extending between a first pair of opposite sides, each said fastening part further includes a cylindrical opening extending between a second pair of opposite sides perpendicularly disposed to said first pair of opposite sides, said cylindrical opening intersecting a portion of said elongated port located adjacent said support bracket.

6. A coupling assembly according to claim 5, wherein each said support bracket includes an outwardly extending plate, said plates facing each other forming a second yoke of sufficient size to receive said fastening part therein,
each said second yoke includes a pair of aligned apertures opposite each other, said apertures receiving a pivot axle extending from opposite sides of an opening in said fastening part for pivotal movement within said second yoke.

7. A coupling assembly according to claim 2, wherein each said fastening part includes a pair of spaced, parallel extending arms forming a further yoke, said arms receiving a portion of said support bracket therebetween, each said fastening part further includes a separate aperture extending through each arm, said apertures each being aligned with an aperture extending through the portion of said support bracket between said arms for receiving a pivot axle through said aligned apertures.

8. A coupling assembly according to claim 7, wherein each said aperture extending through each arm of each said fastening part is of cylindrical configuration.

9. A coupling assembly according to claim 7, wherein each said aperture extending through each arm of each fastening part is of elongated configuration.

10. A coupling assembly according to claim 2, in combination with an implement, wherein said implement includes a pair of integrally attached connecting elements, said connecting elements being disposed adjacent opposite ends of said cross-bar assembly and said connecting elements including through apertures sufficient in size to allow insertion of said elements onto attachment axles which comprise said implement holding means, said axles projecting outwardly from opposite ends of said cross-bar,
said implement further including a yoke of sufficient size to pivotally engage an end portion of said thrust bar.

11. A coupling assembly according to claim 1, wherein each said traction bar assembly comprises a single plate member pivotally attached to a support bracket.

12. A coupling assembly according to claim 11, wherein a support frame is pivotally attached to the single plate member of each said traction bar assembly, said support frame including a vertically extending yoke and a horizontally extending yoke, respectively, wherein a ballast element is attached to said horizontally extending yoke and a second end portion of said thrust bar is pivotally attached to said vertically extending yoke to limit movement of said support frame relative to said rectangularly-shaped frame fixedly attached to said vehicle.

13. A coupling assembly according to claim 1, wherein each said traction bar includes a first part pivotally attached to one of said support brackets for pivotal movement in a vertical plane;

and a second part pivotally attached to said first part for pivotal movement in a horizontal plane.

14. A coupling assembly according to claim 13, wherein said screw adjustment means comprise a first screw member extending from each said support bracket into pivotal engagement with an attached one of said traction bar second parts, and a second screw member extending from each said traction bar second part into pivotal engagement with said tubular connecting member extending between said support brackets.

15. A coupling assembly according to claim 14, wherein each traction bar second part includes an attachment device pivotally engaging both a first and second screw member, respectively, each said attachment device comprising a base portion welded to one of said second parts and an arm portion extending from said base portion in a direction substantially parallel to said second part, said arm portion including a through aperture aligned with a through aperture formed in said second part, wherein said arm portion is spaced from said second part a distance sufficient to allow for insertion of a swivel-shaped end portion of one of said first screw members between said arm portion and said second part.

16. A coupling assembly according to claim 15, wherein said attachment device further comprises a fastening element including a pin-shaped end portion of sufficiently small diameter to allow for insertion of said pin-shaped end portion through aligned apertures in said arm portion, said swivel and said second part, respectively, said fastening element further including an end portion having an aperture extending therethrough, said end portion having a sufficiently small thickness to allow for insertion of said end portion within a yoke extending from an end portion of said second screw member, said extending yoke including a pair of arms having apertures extending therethrough, said apertures being alignable with the aperture extending through the end portion of said fastening element, thereby allowing a pivot axle to extend through said aligned apertures and pivotally join said fastening element with said second screw member.

* * * * *